(12) United States Patent
Ikegami et al.

(10) Patent No.: US 9,927,286 B2
(45) Date of Patent: Mar. 27, 2018

(54) SEISMIC SENSING WITH OPTICAL FIBER

(71) Applicant: Schlumberger Technology Corporation, Sugar Land, TX (US)

(72) Inventors: Toru Ikegami, Machida (JP); Masafumi Fukuhara, Sagamihara (JP)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 113 days.

(21) Appl. No.: 14/964,533

(22) Filed: Dec. 9, 2015

(65) Prior Publication Data
US 2016/0170083 A1 Jun. 16, 2016

Related U.S. Application Data

(60) Provisional application No. 62/091,640, filed on Dec. 15, 2014.

(51) Int. Cl.
*G01V 11/00* (2006.01)
*G01H 9/00* (2006.01)

(52) U.S. Cl.
CPC ..... *G01H 9/004* (2013.01); *G01V 2210/1429* (2013.01)

(58) Field of Classification Search
CPC ................ G01H 9/004; G01V 2210/1429
USPC ..................................... 367/25, 35
See application file for complete search history.

(56) References Cited

U.S. PATENT DOCUMENTS

| | | | |
|---|---|---|---|
| 4,443,698 A | 4/1984 | Schiffner | |
| 4,843,233 A | 6/1989 | Leunhomme | |
| 5,563,967 A | 10/1996 | Haake | |
| 6,389,187 B1 | 5/2002 | Greenaway et al. | |
| 7,324,714 B1 | 1/2008 | Cranch et al. | |
| 7,379,631 B2 | 5/2008 | Poland et al. | |
| 7,586,617 B2 | 9/2009 | Hartog et al. | |
| 7,664,347 B2 | 2/2010 | Childers et al. | |
| 7,668,411 B2 | 2/2010 | Daview et al. | |
| 7,772,541 B2 | 8/2010 | Froggatt et al. | |
| 7,903,908 B2 | 3/2011 | MacDougall et al. | |
| 8,265,431 B2 | 9/2012 | Childers et al. | |

(Continued)

FOREIGN PATENT DOCUMENTS

| | | |
|---|---|---|
| EP | 2180140 | 4/2010 |
| WO | 2010/136764 | 12/2010 |

(Continued)

OTHER PUBLICATIONS

Yosuke Mizuno, et al., "Proposal of Brillouin optical correlation-domain reflectrometry (BOCDR)," Optics Express, 2008, vol. 16, pp. 12148-12153.

(Continued)

*Primary Examiner* — Daniel L Murphy
(74) *Attorney, Agent, or Firm* — Trevor G. Grove

(57) ABSTRACT

A technique facilitates geophysical exploration and comprises deploying an optical fiber in a borehole formed in a formation. A seismic signal, e.g. seismic waves, is excited into the formation, and an optical interrogation system is used to obtain data at a plurality of fixed, sampling locations along the optical fiber. The data is processed to determine features in the formation. Based on the processed data, updated sampling locations are selected along the optical fiber to enable further analysis of the features of interest.

16 Claims, 4 Drawing Sheets

(56) References Cited

U.S. PATENT DOCUMENTS

| | | |
|---|---|---|
| 9,617,848 B2* | 4/2017 | Hill ................... E21B 43/11857 |
| 2011/0188344 A1 | 8/2011 | Hartog et al. |
| 2011/0292763 A1 | 12/2011 | Coates et al. |
| 2011/0320147 A1 | 12/2011 | Brady et al. |
| 2012/0046866 A1 | 2/2012 | Meyer et al. |
| 2012/0067118 A1 | 3/2012 | Hartog et al. |
| 2012/0257475 A1 | 10/2012 | Luscombe et al. |
| 2012/0323075 A1 | 12/2012 | Younge et al. |
| 2013/0091942 A1 | 4/2013 | Samson et al. |
| 2015/0075276 A1* | 3/2015 | Cooper ................ E21B 47/123 73/152.58 |
| 2017/0074998 A1* | 3/2017 | McColpin ................ G01V 1/40 |

FOREIGN PATENT DOCUMENTS

| WO | 2012/123760 | 9/2012 |
|---|---|---|
| WO | WO 2013090544 A1 * | 6/2013 |
| WO | 2015/150781 | 10/2015 |

OTHER PUBLICATIONS

Combined search and examination report for the equivalent UK patent application No. 1521750.8 dated Feb. 12, 2016.

\* cited by examiner

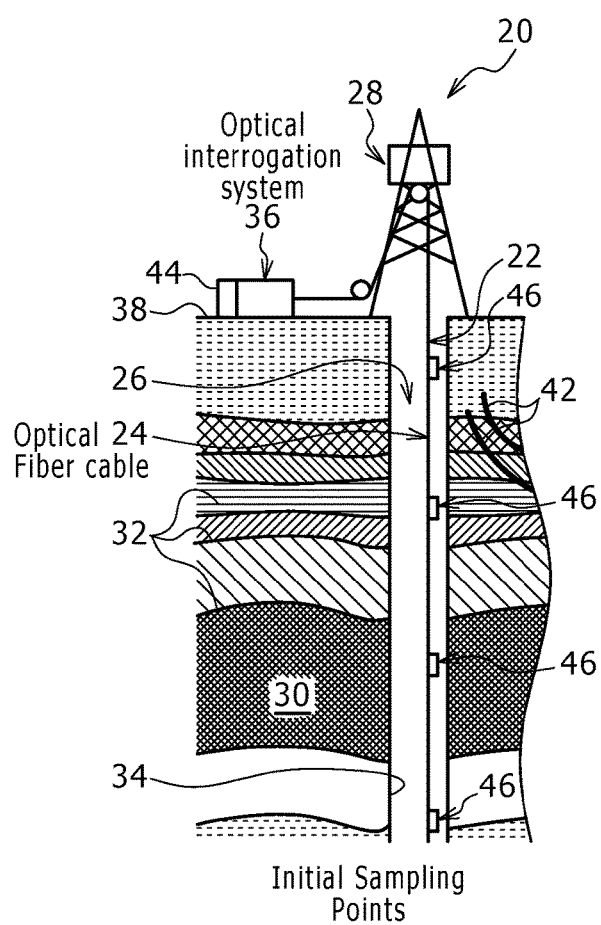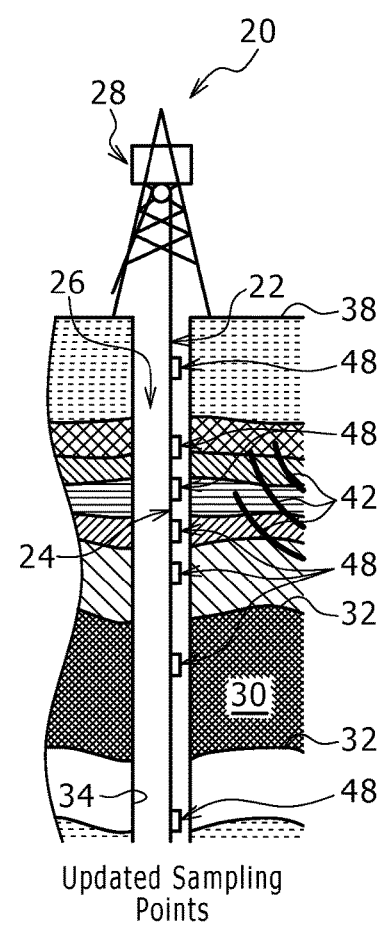
FIG. 3 — Initial Sampling Points
FIG. 4 — Updated Sampling Points

SEISMIC SENSING WITH OPTICAL FIBER

RELATED APPLICATIONS

This application claims the benefit of a related U.S. Provisional Application Ser. No. 62/091,640 filed Dec. 15, 2014, entitled "Seismic Sensing with Optical Fiber," to Tom IKEGAMI and Masafumi FUKUHARA, the disclosure of which is incorporated by reference herein in its entirety.

BACKGROUND

Hydrocarbon fluids such as oil and natural gas are obtained from a subterranean geologic formation, referred to as a reservoir. Various forms of geophysical exploration are employed to better understand the location, size, and characteristics of the reservoir. For example, seismic exploration techniques have been employed to facilitate an improved understanding of the reservoir. Some applications use an array of seismic receivers which are oriented in a specific direction with respect to the earth coordinate system to obtain desired seismic data. In other applications, conventional data obtained during seismic exploration can be pre-processed to a form representative of data obtained with such oriented seismic receivers. The seismic array places the seismic receivers at fixed spacing to obtain point measurements when accumulating the seismic data.

SUMMARY

In general, a system and methodology are provided for facilitating geophysical exploration. A technique comprises deploying an optical fiber in a borehole formed in a formation. A seismic signal, e.g. a seismic wave, is excited into the formation, and an optical interrogation system is used to obtain data at a plurality of predetermined sampling locations along the optical fiber. The data is processed to determine features in the formation. Based on the processed data, updated sampling locations are selected along the optical fiber to enable further analysis of the features of interest.

However, many modifications are possible without materially departing from the teachings of this disclosure. Accordingly, such modifications are intended to be included within the scope of this disclosure as defined in the claims.

BRIEF DESCRIPTION OF THE DRAWINGS

Certain embodiments of the disclosure will hereafter be described with reference to the accompanying drawings, wherein like reference numerals denote like elements. It should be understood, however, that the accompanying figures illustrate the various implementations described herein and are not meant to limit the scope of various technologies described herein, and:

FIG. 3 is a schematic illustration of an example of a seismic system utilizing an optical fiber deployed in a borehole to obtain seismic data at initial sampling locations, according to an embodiment of the disclosure;

FIG. 4 is a schematic illustration of an example of a seismic system utilizing an optical fiber deployed in a borehole to obtain seismic data at updated sampling locations, according to an embodiment of the disclosure.

DETAILED DESCRIPTION

Figure 1:
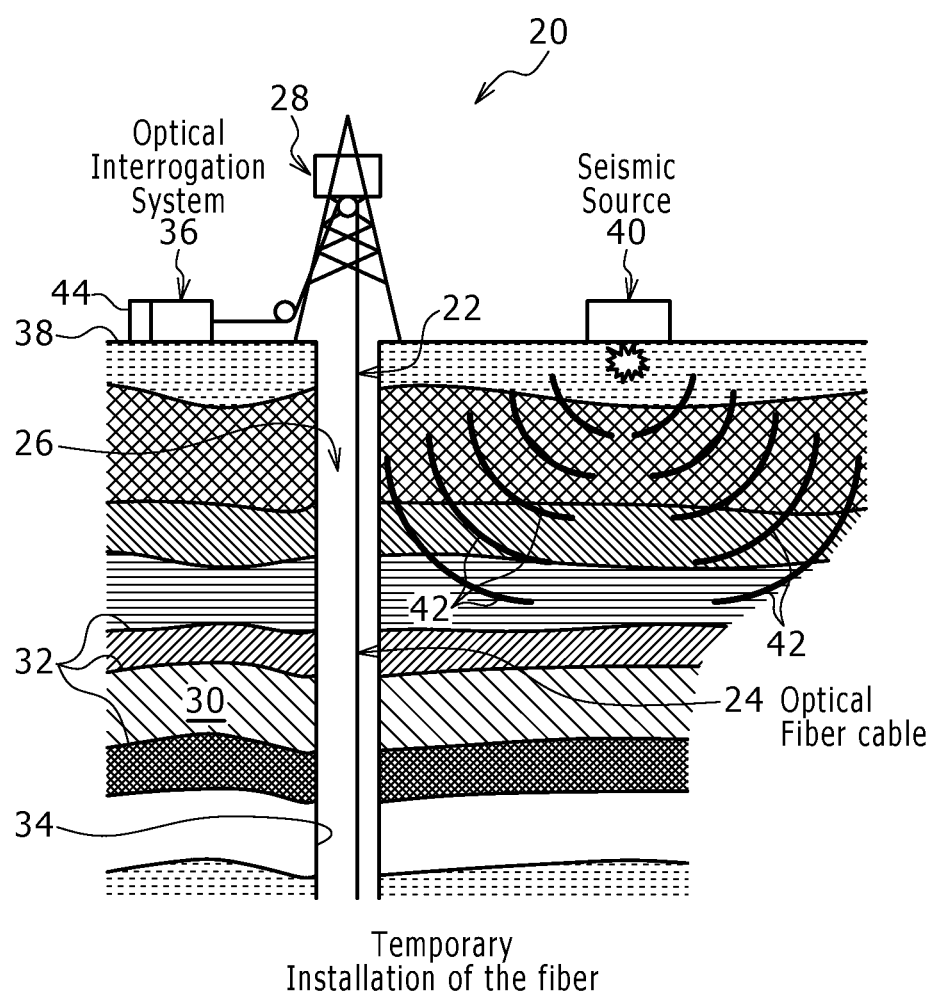
FIG. 1 is a schematic illustration of an example of a seismic system having an optical fiber deployed in a borehole to facilitate geophysical exploration, according to an embodiment of the disclosure.

In the following description, numerous details are set forth to provide an understanding of some embodiments of the present disclosure. However, it will be understood by those of ordinary skill in the art that the system and/or methodology may be practiced without these details and that numerous variations or modifications from the described embodiments may be possible.

The disclosure herein generally involves a system and methodology which facilitate geophysical exploration, e.g. seismic geophysical exploration. The system and methodology utilize a technique by which specific regions along an optical fiber are selected for obtaining seismic measurements and then those specific regions are adjusted to improve the spacing and the overall resolution of the collected seismic data with respect to formation features. According to an example, the technique comprises deploying an optical fiber in a borehole formed in a formation and exciting a seismic signal, e.g. seismic waves, into the formation. An optical interrogation system is used to obtain data at a plurality of predetermined sampling locations along the optical fiber. The data is processed to determine features in the formation. Based on the processed data, updated sampling locations are selected along the optical fiber to enable further analysis of the features of interest.

According to an embodiment, a seismic system employs a downhole measurement system and methodology to address issues associated with conventional seismic sensor arrays. Examples of such issues include movement of the seismic sensor array to cover an entire depth interval, loss of useful data due to poor sensor coupling, and fixed sensor spacing. In various applications, such issues may be addressed with a fiber optical vibration sensing, e.g. strain sensing, technology, as described in greater detail below.

Generally, when the total length (aperture) of the seismic sensor array is shorter than the depth interval of interest, the whole array is moved to cover the entire depth interval. The movement consumes increased amounts of time in acquisition of the data. Additionally, the quality of the data can be affected because the entire depth interval is not covered by the same excitation of the seismic source. The embodiments described herein address this issue by utilizing an optical fiber which is positioned through the depth interval of interest. Sensing locations along the optical fiber may effectively be moved by selecting different data sampling locations along the optical fiber.

The issue of loss of useful data due to poor sensor coupling may be considered a data quality issue related to operational efficiency. Coupling of the seismic sensors, e.g. seismic receivers, to a borehole wall is employed to obtain data, but the coupling can be less than optimal due to various limitations related to, for example, borehole rugosity and poor cementing behind the casing. If a poor coupling is observed in the data of conventional systems, the receiver coupling operation is repeated to ensure a good coupling. If the data does not improve, the entire array is moved slightly and the coupling operation is performed again. When the number of seismic receiver stations is large, substantial amounts of time can be consumed in such movement and sometimes data from a given receiver is abandoned to save operation time. However, embodiments described herein enable movement of the data sensing/sampling locations to different updated locations simply by selecting new locations along the optical fiber when the data indicates poor coupling at certain sensing locations.

The third issue of fixed sensor spacing is related to resolution of the seismic measurement. Although the wavelength of the borehole seismic measurement may be on the order of tens of meters, the waveform obtained by a given seismic sensor/receiver located just above a formation layer or boundary is quite different from the waveform obtained from a receiver located just below the layer or boundary. As result, a desired resolution for understanding a formation layer or boundary may be much finer than the wavelength of the seismic wave. Decreasing the inter-receiver spacing is difficult with conventional seismic receiver arrays. However, embodiments described herein enable movement of sensing/sampling locations to different updated locations along the optical fiber to adjust the spacing between the sensing/sampling locations. For example, the spacing may be reduced in certain regions of the optical fiber to provide greater resolution of the data with respect to specific formation features, such as formation layers and layer boundaries.

According to an embodiment, a fiber optic sensor system may be employed over an entire depth interval of interest, and the fiber optic sensor system may be used to obtain quality seismic sensor data with much greater resolution in desired regions, e.g. a much finer spatial sampling at desired regions along the borehole. By way of example, the fiber optic sensor system may comprise a downhole measurement system which employs a method for measuring local strain in an arbitrary location of an optical fiber with a fine resolution, e.g. a resolution on the order of a few centimeters or less. Examples of such methodologies or techniques for sensing seismic waveforms along a borehole comprise Brillouin Optical Correlation Domain Reflectometry (BOCDR) and Brillouin Optical Correlation Domain Analysis (BOCDA). The techniques enable oriented data to be obtained via detection of local strain at various, specific locations along an optical fiber.

Referring generally to FIG. 1, an example of a seismic system 20 is illustrated as deploying a downhole seismic measurement system 22. The downhole seismic measurement system 22 comprises an optical fiber 24 deployed downhole along a borehole 26 via surface equipment 28. The fiber or fibers 24 may be located in an optical fiber cable. The borehole 26 may be drilled into or through a formation 30 having a plurality of formation layers 32. In some applications, the borehole 26 is lined with a casing 34, and the optical fiber 24 may be positioned along the casing 34. In the specific example illustrated, the downhole seismic measurement system 22 is temporarily installed along the borehole 26 via a wireline or other suitable conveyance.

The seismic system 20 further comprises an optical interrogation system 36 coupled with the optical fiber 24 for sending, receiving, and analyzing optical signals. As with a variety of optical systems, the optical interrogation system 36 initiates and receives optical signals which may be analyzed via processors in system 36 to determine strain at specific locations along optical fiber 24. The optical interrogation system 36 may be positioned at a surface location 38 or at another suitable location. In the example illustrated, seismic system 20 also comprises a seismic source 40 which may be located at the surface, along the borehole 26, and/or at another suitable location or locations. The seismic source 40 establishes seismic signals 42, e.g. seismic waves, which propagate through the formation layers 32 of formation 30 for detection by optical fiber 24 at selected sensing/sampling locations.

Figure 2:
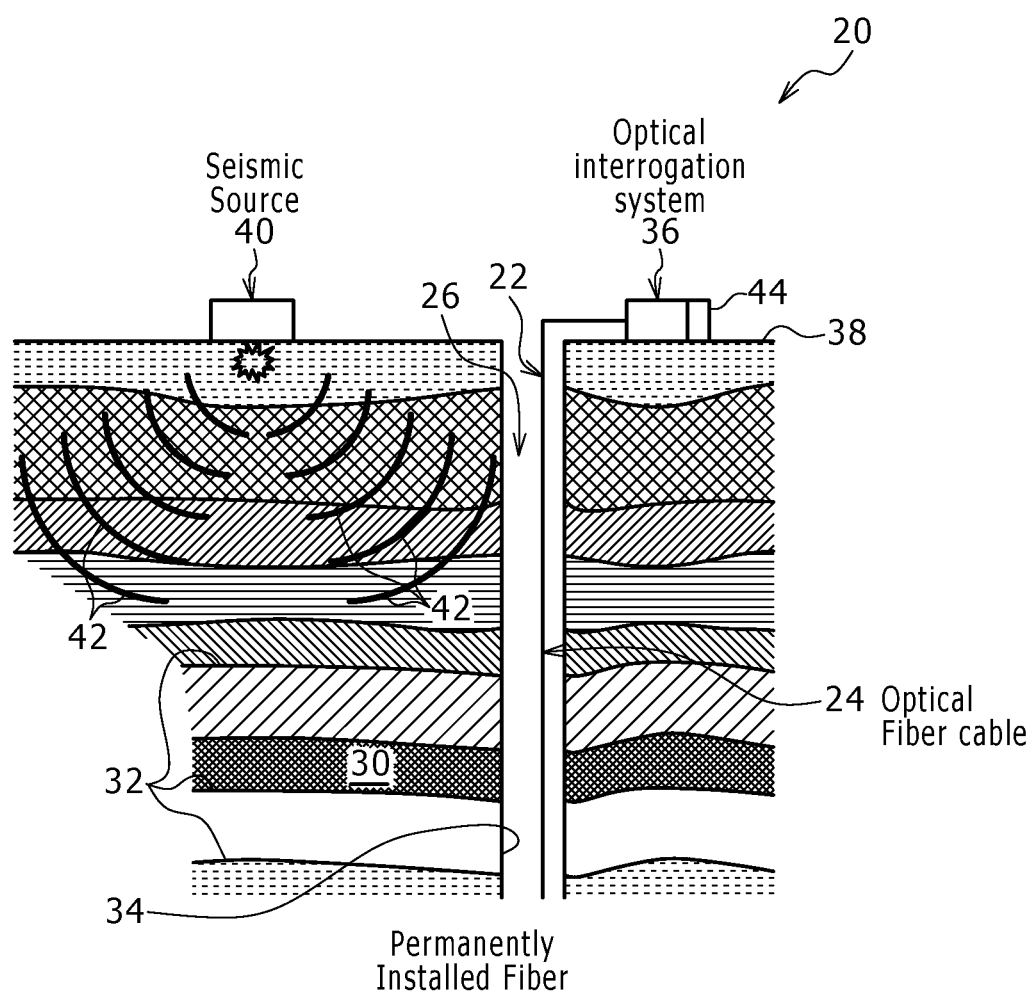
FIG. 2 is a schematic illustration of another example of a seismic system having an optical fiber deployed in a borehole to facilitate geophysical exploration, according to an embodiment of the disclosure.

In another embodiment, the downhole seismic measurement system 22 may be permanently installed along borehole 26 as illustrated in FIG. 2. For example, the optical fiber 24 may be permanently affixed to or otherwise installed along casing 34 of borehole 26. Optical signals are similarly sent along the optical fiber 24 via optical interrogation system 36. Those optical signals are affected by vibrations/strains acting on the optical fiber 24. The optical signals are then processed by optical interrogation system 36 to determine the strains at specific locations along the optical fiber 24.

In the embodiments illustrated, the optical interrogation system 36 may be employed to obtain measurements of strain caused by the seismic signals/waves 42 affecting the optical fiber 24 at arbitrary locations along the optical fiber. The measurements of strain may be obtained as a consequence of a time series signal by interlaced scanning. The optical interrogation system 36 may comprise a data acquisition system 44 which, for example, stores the seismic data, applies pre-conditioning to the data, performs quality control processing of the data, and performs seismic processing of the data.

According to a methodology, the seismic system 20 utilizes the capability of the optical interrogation system 36 to measure the strain caused by the seismic wave at arbitrary locations along the optical fiber 24 with a resolution on the order of tens of centimeters or less. In some applications, the resolution enables measurement of strain at arbitrary locations with a resolution of less than 1 m, and in some embodiments less than 20 cm, with respect to locations along the optical fiber 24.

During a seismic operation, the seismic waves may be sampled at finite measurement locations along the optical fiber 24. For example, the seismic waves may be sampled at 100 or more points along the optical fiber 24. Although the methodology enables sampling of the seismic waves over the entire length of the optical fiber 24, a relatively large amount of data would be acquired. The size of the data acquisition encourages sampling the seismic wave effects, e.g. measuring strain, at finite measurement points along the optical fiber 24.

To address the issues discussed above related to data quality and resolution of measurement, the seismic wave data is initially sampled at fixed, pre-defined sampling locations 46, e.g. sampling points, as represented in FIG. 3. In some applications, the pre-defined sampling locations 46 are spaced at constant intervals along the optical fiber 24. However, the pre-defined sampling locations 46 can be selected at other initial, fixed locations along the optical fiber 24.

After evaluating the seismic data obtained from optical fiber 24 at the fixed sampling locations 46, the sampling points 46 are updated and new, revised sampling points 48 are selected, as represented in FIG. 4. For example, if the data analyzed from the pre-defined sampling locations 46 provides evidence of unsuitable coupling, the sampling locations 46 can simply be updated to the revised sampling points 48. The optical interrogation system 36 is then operated to obtain data from the new and different locations along the optical fiber 24, namely the revised sampling locations 48. For example, if certain formation layers or thin bed boundaries are observed after the first measurement at pre-defined sampling locations 46, the revised sampling locations 48 may be selected such that a greater concentration of sampling locations 48 is located near the desired features.

Figure 5:
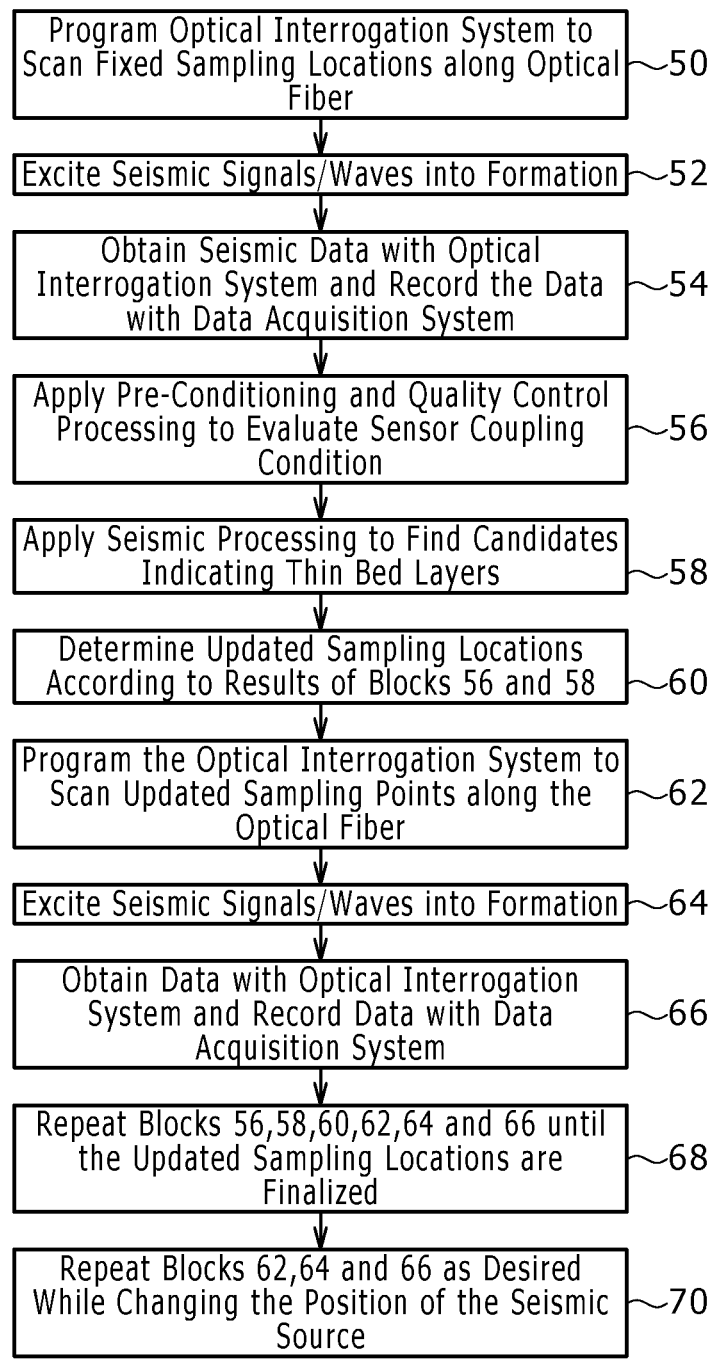
FIG. 5 is a flowchart illustrating an example of a procedure for utilizing an optical fiber in a geophysical exploration operation, according to an embodiment of the disclosure.

Referring generally to FIG. 5, a flowchart is provided to illustrate an example of a methodology for improving collection of seismic data based on updating of seismic wave measurement locations along an optical fiber. Initially, the optical interrogation system 36 may be programmed so that it scans pre-defined sampling locations 46 along optical fiber 24, as represented by block 50. The pre-defined sampling locations 46 may comprise fixed portions of the optical fiber spaced at constant or differing intervals to achieve a desired resolution. In an example of an application, the sampling locations 46 may be fixed at 100 points along the optical fiber 24 with intervals of 50 feet between the points. However, this is merely an example, and greater or lesser numbers of locations 46 may be selected with larger or smaller intervals that are constant or varied depending on the parameters of a given application.

Once the optical interrogation system is suitably programmed, seismic signals 42, e.g. waves, may be excited into the formation 30, as represented by block 52. Seismic data is then obtained with the optical interrogation system 36 and the seismic data is recorded by the data acquisition system 44, as represented by block 54. Pre-conditioning and quality control processing is then applied to the recorded data to evaluate the sensor coupling condition at the pre-defined sampling locations 46, as represented by block 56. The sensor coupling condition refers to the operational coupling of the optical fiber 24 with respect to the wall of borehole 26 at sampling locations 46 to enable acquisition of data of sufficient quality. Seismic processing is then also applied to the recorded seismic data to determine features of interest, e.g. thin bed layer candidates among the layers 32 of formation 30, as represented by block 58.

The processing of the acquired seismic data as described above with reference to blocks 56, 58 may be used to determine updated sampling locations 48 along the optical fiber 24, as represented by block 60. The programming of the optical interrogation system 36 is then reprogrammed to scan the updated sampling locations 48 along the optical fiber 24, as represented by block 62. Once again the seismic signals/waves are excited into the formation 30, as represented by block 64. The excitation enables optical interrogation system 36 to acquire additional seismic data and to record the data via data acquisition system 44, as represented by block 66.

In a variety of applications, the acquisition of data, processing of that data, and reprogramming of the optical interrogation system 36 as described above with reference to blocks 56, 58, 60, 62, 64 and 66 may be repeated until the desired, updated sampling locations 48 are finalized, as represented by block 68. In some applications, the programming of the optical interrogation system 36, the excitation of seismic signal/waves 42, and the acquisition/recording of data by optical interrogation system 36 and data acquisition system 44 may be repeated while changing the location of seismic source 40, as represented by block 70. Depending on the environment and application, the optical interrogation system 36 may be programmed to acquire data from a variety of locations along optical fiber 24. That data is then processed according to suitable models and algorithms, such as certain models and algorithms available commercially.

By way of example, the measurements obtained at the pre-defined sampling locations 46 and updated locations 48 may be in the form of strain measurements resulting from the effects of seismic signals/waves 42 acting on optical fiber 24 at those specific locations. The seismic, e.g. strain, measurements may be obtained and analyzed by, for example, techniques such as Brillouin Optical Correlation Domain Reflectometry (BOCDR) or Brillouin Optical Correlation Domain analysis (BOCDA).

Depending on the specifics of a given application and/or environment, the procedures for obtaining seismic data from the downhole seismic measurement system 22 may vary. Additionally, the configuration of the overall seismic system 20, as well as the components of the overall system, may be adjusted to accommodate the parameters of a given procedure and/or environment. For example, optical data may be transferred downhole and uphole along the optical fiber via a variety of techniques and optical interrogation systems 36.

Additionally, the processing system within the optical interrogation system 36 may comprise a variety of individual or plural processors and may include a single processing unit or a plurality of processing units, e.g. a surface processing unit located on-site and/or remotely. The collected seismic data may be subjected to various available software, models, algorithms, and other processing techniques to obtain the desired seismic data, e.g. strain data, from the initial, pre-defined locations 46 and from the subsequently updated locations 48. The data obtained from the updated locations 48 may be processed and analyzed according to a variety of techniques to provide information regarding formation 30, boundary layers within formation layers 32, and/or other formation features.

Although a few embodiments of the disclosure have been described in detail above, those of ordinary skill in the art will readily appreciate that many modifications are possible without materially departing from the teachings of this disclosure. Accordingly, such modifications are intended to be included within the scope of this disclosure as defined in the claims.

What is claimed is:

1. A method for geophysical exploration, comprising:
   deploying an optical fiber in a borehole formed in a formation;
   exciting seismic waves into the formation;
   using an optical interrogation system to obtain data at a plurality of predetermined sampling locations along the optical fiber;
   processing the data to determine features in the formation; and
   selecting updated sampling locations along the optical fiber based on the locations of the features.

2. The method as recited in claim 1, further comprising programming the optical interrogation system to scan the updated sampling locations.

3. The method as recited in claim 2, further comprising repeating the excitation of seismic waves into the formation.

4. The method as recited in claim 3, further comprising using the optical interrogation system to scan the updated sampling locations and to obtain data at the updated sampling locations.

5. The method as recited in claim 4, wherein exciting comprises exciting the seismic waves with a seismic source positioned at a surface location.

6. The method as recited in claim 5, further comprising moving the seismic source and repeating the excitation of seismic waves.

7. The method as recited in claim 1, wherein deploying comprises removably deploying the optical fiber in the borehole.

8. The method as recited in claim 1, wherein deploying comprises permanently deploying the optical fiber in the borehole.

9. The method as recited in claim 1, wherein deploying comprises deploying the optical fiber along a casing lining the borehole.

10. The method as recited in claim 1, wherein processing comprises processing the data to determine boundary layers in the formation.

11. A system for geophysical exploration, comprising:
a downhole measurement system having an optical fiber deployed in a borehole formed in a formation;
a seismic source positioned to excite a seismic signal into the formation; and
an optical interrogation system coupled to the optical fiber, the optical interrogation system scanning a plurality of fixed, sampling locations along the optical fiber to obtain strain data at the plurality of fixed, sampling locations, the strain data being processed by the optical interrogation system until updated locations along the optical fiber are determined.

12. The system as recited in claim 11, wherein the optical fiber is fixed along the borehole.

13. The system as recited in claim 11, wherein the optical fiber is removable from the borehole.

14. The system as recited in claim 11, wherein the seismic source is positioned at a surface location.

15. The system as recited in claim 11, wherein the optical interrogation system comprises a data acquisition system to record data acquired at the plurality of fixed locations and at the updated locations.

16. The system as recited in claim 11, wherein the updated locations are selected so as to be positioned along boundary layers within the formation.

\* \* \* \* \*